March 24, 1936.  I. B. NIELSEN  2,035,093
LUBRICANT SUPPLY FIXTURE
Filed July 17, 1933  2 Sheets-Sheet 1
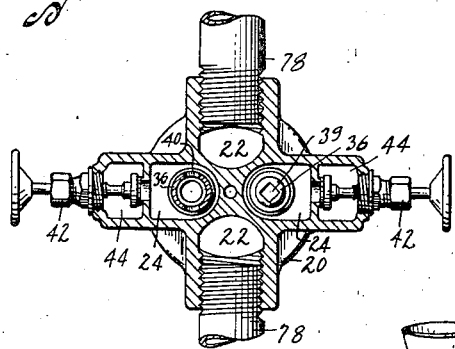
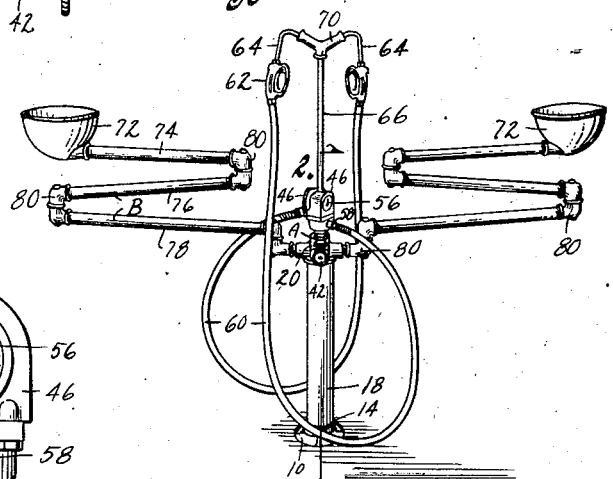
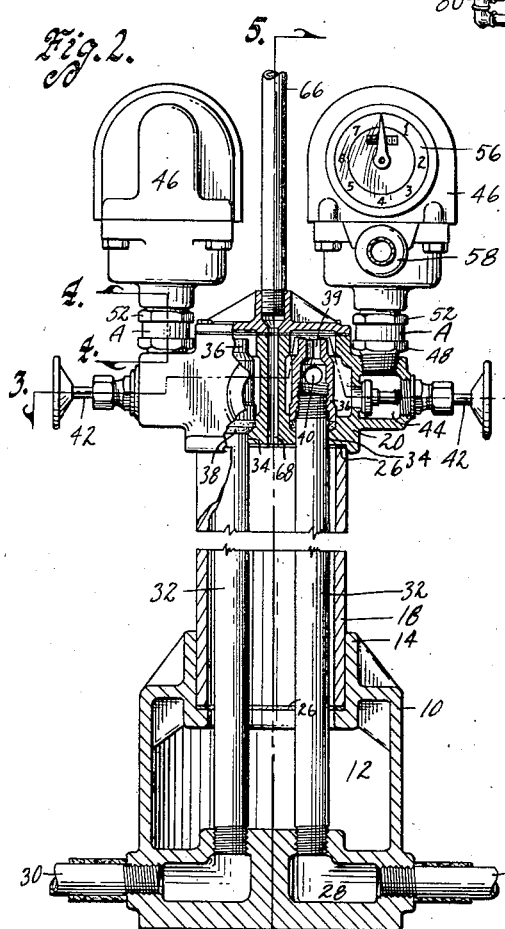
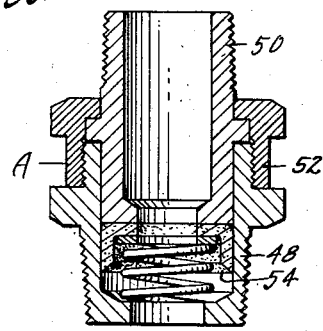
Inventor
~Iver B. Nielsen~
By Bair, Freeman & Sinclair
Attorneys
Witness
H. S. Munzenmaier

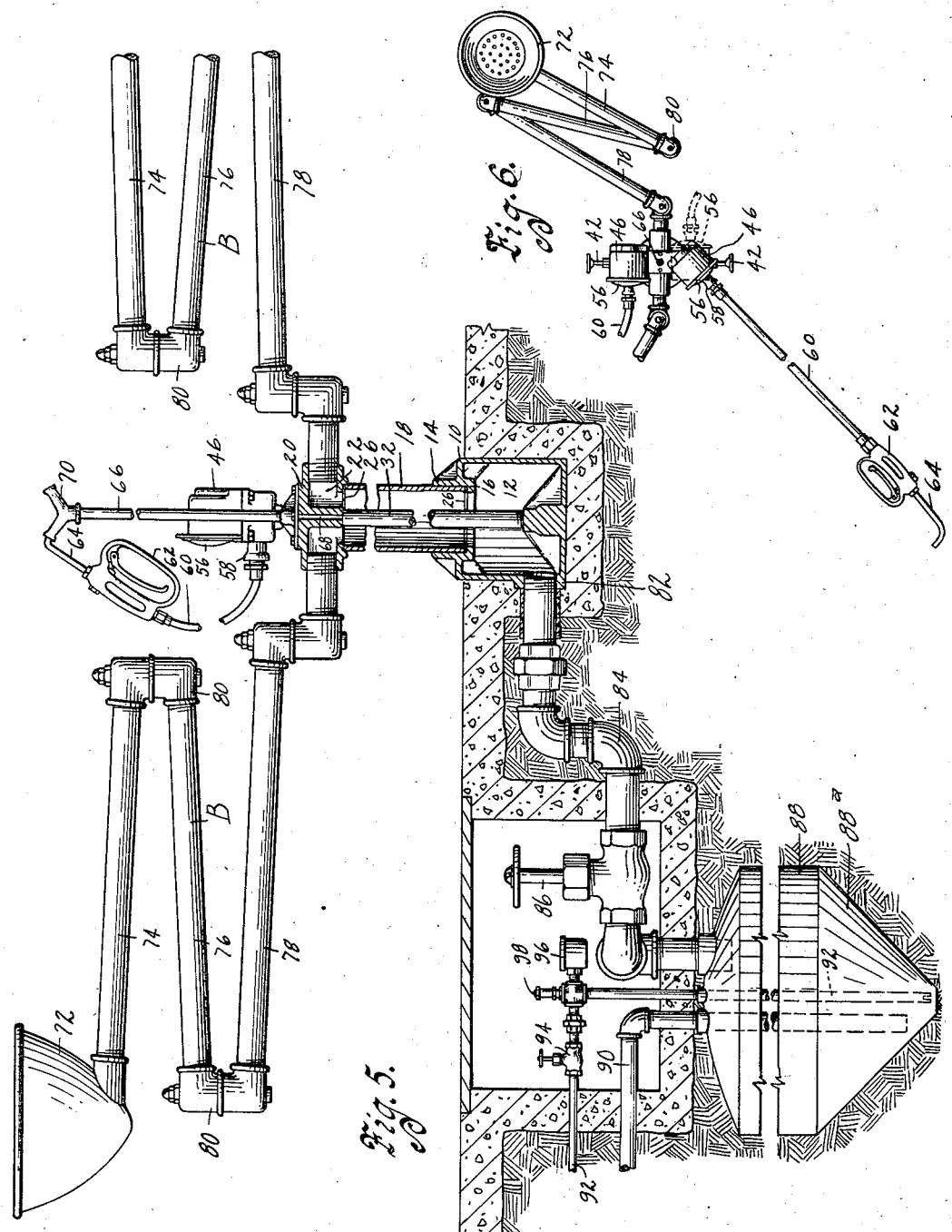

Patented Mar. 24, 1936

2,035,093

UNITED STATES PATENT OFFICE 2,035,093

LUBRICANT SUPPLY FIXTURE

Iver B. Nielsen, Bryan, Ohio, assignor to The Aro Equipment Corporation, Bryan, Ohio, a corporation of Ohio Application July 17, 1933, Serial No. 680,753

14 Claims. (Cl. 184—1.5)

An object of my present invention is to provide a fixture adapted for use in garages and service stations having novel and simple means of connecting the parts thereof together and providing for both the supply of lubricant from and the draining of old cylinder oil through the same stand.

A further object is to provide a fixture of this character in which meters are swively mounted with lubricant hoses extending from their registering face sides so that regardless of the position of the discharge end of the hose with respect to the fixture the registering face of the meter can be readily seen by pulling the hose taut, thus facing the meter toward the user.

A further object is to provide a fixture in which a base fitting, a stand tube and a head fitting are held assembled by pipes which extend through the stand tube and conduct oil independent of the space in the stand tube through which the old cylinder oil is drained to a storage tank.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a perspective view of a lubricant supply and drain fixture embodying my invention.

Figure 2 is an enlarged sectional view on the line 2—2 of Figure 1, showing internal constructional details.

Figure 3 is a horizontal section view on the line 3—3 of Figure 2 showing relationship of various cavities in the head fitting of the device.

Figure 4 is an enlarged view on the line 4—4 of Figure 2 showing a swivel connection for a meter.

Figure 5 is a sectional view on the line 5—5 of Figure 2 and showing the parts on a slightly reduced scale; and Figure 6 is a partial plan view of the fixture.

On the accompanying drawings I have used the reference numeral 10 to indicate generally a base fitting. It has a reception chamber 12 therein and is provided with a hub 14 having a flange at 16 and constituting a reception socket for the lower end of a stand tube 18. A head fitting 20 having drain cavities 22 and supply cavities 24 is mounted on the upper end of the stand tube 18. Gaskets 26 are interposed between the ends of the stand tube 18 and the fittings 10 and 20.

A double internal elbow fitting 28 is formed in the base fitting 10 as best shown in Figure 2. Supply pipes 30 communicate therewith for supplying different grades of lubricant to the two cavities of the internal elbow fitting 28. Upright supply pipes 32 extend from the two cavities in the fitting 28 and through openings 34 in the head fitting 20. The upper ends of the pipes 32 communicate with the cavities 24 in the head fitting.

Retainer nuts or sleeves 36 are screwed onto the upper ends of the pipes 32 and engage packings 38 so that when the nuts 36 are tightened the packings are compressed, the head fitting 20 is drawn down for compressing the upper gasket 26 thus drawing the stand tube 18 downwardly for compressing the lower gasket 26, thus rigidly assembling the fittings 10 and 20 and the tube 18 for sealing them relative to each other. The upper ends of the nuts 36 are provided with square sockets 39 to receive tools for rotating them and are provided with perforations 40 to permit ready flow of lubricant from the pipes 32 into the cavities 24.

Associated with each cavity 24 is a valve 42, the body of which is preferably formed as a part of the head fitting. Swivel fittings A communicate with cavities 44 surrounding the valves 42 and meters 46 are mounted on the swivel fittings. Each swivel fitting A comprises nipple members 48 and 50, a retainer nut 52 and a packing cup 54 for sealing the joint yet permitting it to swivel.

Each meter 46 is provided with a registering face 56 and on the face side a discharge boss 58 is mounted. Supply hoses 60 are connected with the discharge bosses 58 and terminate in valve controlled handles 62 having discharge nozzles 64.

A hollow upright 66 communicates with the interior of the stand tube 18 through a passage 68 in the head fitting 20. Hollow arms or a Y-shaped hollow fitting 70 is mounted on the upper end of the upright 66 to receive the discharge nozzle 64 when not in use.

Swingably mounted drain cups 72 are associated with the cavities 22 through swivel arm members B. Each arm member B is composed of sections 74, 76 and 78 connected together by swivel joints 80 such as shown in my co-pending application, Serial No. 566,847.

The base fitting 10 has a discharge boss 82 with which a drain pipe 84 communicates. The drain pipe 84 leads through a valve 86 to a storage tank 88. The storage tank 88 has a cone-shaped bottom 88a.

A clean-out pipe 90 extends from adjacent the bottom 88a of the tank 88 to any suitable place desirable for receiving the contents of the storage tank 88 when it is necessary to clean it out.

A compressed air pipe 92 extends to adjacent the bottom of the tank 88 and is provided with a control valve 94, a pressure gauge 96 and pop valve 98.

*Practical operation*

In the operation of my fixture the fixture itself when of double character as illustrated may be mounted between a pair of automobile lifts or can be provided with a single drain cup 72 if desired. After an automobile is raised on the lift the drain cup 72 can be swung and extended to position beneath the drain plug in the crank case so that oil can be drained into the cup 72 through the arm B and the stand tube 18 and finally into the storage tank 88. Due to the sectional character of the arms B they can be extended to any degree within their limits and also swung to any position within their limits relative to the stand tube 18.

When the tank 88 has been filled the contents thereof can be disposed of by closing the valve 86 and opening the valve 94 which discharges air from the lower end of the pipe 92 and agitates any sediment on the cone-shaped bottom 88a besides bubbling up through the oil in the tank to produce a pressure thereon sufficient to expel the oil and sediment through the pipe 90. The pressure of the air can be controlled by the valve 94 and regulated in accordance with the reading on the gauge 96, although if too high pressure is permitted to enter the tank 88 the pop valve 98 will automatically relieve it.

After the oil has been drained from an automobile a fresh supply of oil can be discharged into the crank case from either of the hoses 60, two of them being provided so that oils of different grade or viscosity can be dispensed from the same fixture. The valves 42 can be left open or opened only when it is desired to dispense oil. The valve handles 62 can be manipulated by the operator for regulating the flow and quantity of oil into the crank case, the meter 46 being watched so as to dispense the proper or desired quantity of oil into the crank case.

Due to the swivel mounting of the meters 46 their registering faces 56 can be readily observed by the user as regardless of his position relative to the stand tube 18 he can pull the hose taut and thus swing the face of the meter directly toward himself to readily and correctly read it.

After the dispensing operation the discharge nozzles 64 can be hooked into the tubular arms 70, whereupon any drippings from the nozzles will drain through the upright 66 and the opening 68 into the stand tube 18.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a fixture of the character described, a base fitting having a pair of internal elbow fittings formed therein, and a socket in its upper end, a stand tube seated in said socket, a head fitting having a socket to receive the upper end of said stand tube and having a pair of openings, pipes connected with said elbow fittings and extending through said openings and nuts on the upper ends of said pipes to retain said head fitting against the upper end of said stand tube and the lower end of the stand tube against said base fitting, said nuts being perforated for permitting flow of fluid therethrough.

2. In a fixture of the character described, a base fitting having an elbow fitting formed therein, and a socket in its upper end, a stand tube having its lower end received in said socket, a head fitting having a socket to receive the upper end of said stand tube and having an opening, a pipe connected with said elbow fitting and extending through said opening and a perforated nut on the upper end of said pipe to retain said head fitting, stand tube and base fitting assembled relative to each other.

3. In a fixture of the character described, a base fitting having a pair of internal elbow fittings formed therein, and a socket in its upper end, a stand tube seated in said socket, a head fitting having a socket to receive the upper end of said stand tube and having a pair of openings, pipes connected with said elbow fittings and extending through said openings, nuts on the upper ends of said pipes to retain said head fitting against the upper end of said stand tube and the lower end of the stand tube against said base fitting and packing between said nuts and said head fitting to seal the space surrounding the nuts in said head fitting from said stand tube.

4. In a fixture of the character described, a base fitting having an elbow fitting formed therein and a socket in its upper end, a stand tube having its lower end received in said socket, a head fitting having a socket to receive the upper end of said stand tube and having an opening, a pipe connected with said elbow fitting and extending through said opening, a perforated nut on the upper end of said pipe to retain said head fitting, stand tube and base fitting assembled relative to each other and packing means surrounding said pipe and interposed between said nut and said head fitting.

5. In a fixture of the character described, a base fitting having an elbow fitting formed therein, and a socket in its upper end, a stand tube having its lower end received in said socket, a head fitting having a socket to receive the upper end of said stand tube and having an opening, a pipe connected with said elbow fitting and extending through said opening, a perforated nut on the upper end of said pipe to retain said head fitting, stand tube and base fitting assembled relative to each other, and fluid connections with said elbow fitting and with the space in said head fitting surrounding said perforated nut.

6. In a fixture of the character described, a base fitting having a pair of internal elbow fittings formed therein, and a socket in its upper end, a stand tube seated in said socket, a head fitting having a socket to receive the upper end of said stand tube and having a pair of openings, pipes connected with said elbow fittings and extending through said openings, nuts on the upper ends of said pipes to retain said head fitting against the upper end of said stand tube and the lower end of the stand tube against said base fitting, said nuts being perforated for permitting flow of fluid therethrough, and fluid connections with said elbow fittings and with the spaces in said head fitting surrounding said perforated nuts.

7. In a fixture of the character described, a base fitting having an elbow fitting formed therein, and a socket in its upper end, a stand tube having its lower end received in said socket, a head fitting having a socket to receive the upper end of said stand tube and having an opening, a pipe connected with said elbow fitting and extending through said opening, a perforated nut on the upper end of said pipe to retain said head fitting, stand tube and base fitting assembled relative to each other, said head fitting having a delivery socket opening into the space surrounding said nut, a delivery hose associated with said socket and a valve mounted in said head fitting and located between the nut in said head fitting and said delivery hose.

8. In a fixture of the character described, a base fitting having an elbow fitting formed therein, and a socket in its upper end, a stand tube having its lower end received in said socket, a head fitting having a socket to receive the upper end of said stand tube and having an opening, a pipe connected with said elbow fitting and extending through said opening, a perforated nut on the upper end of said pipe to retain said head fitting, stand tube and base fitting assembled relative to each other, said head fitting having a delivery socket opening into the space surrounding said nut, a delivery hose associated with said socket and a hollow arm to receive the discharge end of said delivery hose when not in use, said hollow arm communicating with said stand tube.

9. In a fixture of the character described, a base fitting having a chamber therein, a pair of internal elbow fittings formed therein, said base fitting having a socket in its upper end, a stand tube seated in said socket, a head fitting having a socket to receive the upper end of said stand tube and having a pair of openings, pipes connected with said elbow fittings and extending through said openings, nuts on the upper ends of said pipes to retain said head fitting against the upper end of said stand tube and the lower end of the stand tube against said base fitting, said nuts being perforated for permitting flow of fluid therethrough and a hollow upright communicating through said head fitting with said stand tube and having hollow projecting arms.

10. In a fixture of the character described, a base fitting having a chamber therein, a pair of internal elbow fittings formed therein, said base fitting having a socket in its upper end, a stand tube seated in said socket, a head fitting having a socket to receive the upper end of said stand tube and having a pair of openings, pipes connected with said elbow fittings and extending through said openings, nuts on the upper ends of said pipes to retain said head fitting against the upper end of said stand tube and the lower end of the stand tube against said base fitting, said nuts being perforated for permitting flow of fluid therethrough, valves in said head fitting communicating with said pipes, supply hoses extending from said valves and a hollow upright communicating through said head fitting with said stand tube and receiving the ends of said supply hoses when not in use.

11. In a fixture of the character described, a base fitting, a stand tube superposed thereon, a head fitting superposed on said stand tube, a pair of dispensing hoses extending from said head fitting, a pair of lubricant supply pipes extending to said base fitting and a pair of tubular tie rods tying said fitting and said stand tube together and conducting oil from said lubricant supply pipes to said lubricant supply hoses.

12. In a fixture of the class described, a base fitting, a head fitting, a stand tube interposed between said fittings and common means extending through said stand tube for retaining said fittings and said stand tube assembled relative to each other and for conducting fluid introduced to one of said fittings from said fitting through said stand tube to the other fitting for delivery therefrom.

13. In a device of the class described, a lubricant supply fixture comprising a standard having foot and head fittings, a plurality of means for supplying different lubricants to said foot fitting, a plurality of independent lubricant discharge hoses extending from said head fitting, and tubular means for tying said foot and head fittings together and for each receiving lubricant from one of said means independent of the other means and conducting it to one of said hoses independent of the other hoses.

14. In a fixture of the character described, a base fitting having a chamber therein and a socket in its upper end, a stand tube seated in said socket, a head fitting having a socket to receive the upper end of said stand tube and having an opening, tubular tie means connected with said base fitting and extending through said opening, a nut on the upper end of said tubular tie means to retain said head fitting against the upper end of said stand tube and the lower end of the stand tube against said base fitting, said head fitting having a chamber communicating with said tubular tie means but isolated from said stand tube.

IVER B. NIELSEN.